April 27, 1965 E. F. HASELTON, JR., ETAL 3,180,947

ELECTRONIC BRIDGE HYBRID CIRCUIT

Filed Sept. 12, 1961

INVENTORS
ERNEST F. HASELTON, JR.
RUDOLF M. HERGENROTHER
BY
Spencer E. Olson
ATTORNEY United States Patent Office 3,180,947
Patented Apr. 27, 1965

3,180,947
ELECTRONIC BRIDGE HYBRID CIRCUIT

Ernest F. Haselton, Jr., West Concord, and Rudolf M. Hergenrother, South Acton, Mass., assignors to Sylvania Electric Products Inc., a corporation of Delaware Filed Sept. 12, 1961, Ser. No. 137,691
6 Claims. (Cl. 179—170)

This invention relates to a hybrid circuit arrangement, and more particularly to an electronic bridge hybrid circuit having particular applicability in the coupling of signals between a two-wire line and a four-wire line such as is used in telephone or other audio circuits.

Hybrid circuit arrangements have long been used in various types of transmission apparatus, particularly in telephone systems, finding application in telephone repeater circuits in addition to its use for coupling between a two-wire line and a four-wire line. In a repeater circuit, where it is necessary to use one piece of apparatus, such as an amplifier, in a transmission line which carries telephone conversations in two directions, the hybrid circuit is used to prevent the output of the amplifier from being fed back into the input which would otherwise cause oscillation and degrade communication quality.

The hybrid circuit most commonly used in telephone systems is a differential transformer having three windings arranged to provide three pairs of output terminals or ports, and an internal balance terminal. The transformer, known as a hybrid coil, may take a variety of forms, the common objective being to properly match the impedances for all three of the pairs of output terminals.

Although the hybrid coil performs the function of providing isolation between the three terminals sufficiently well as to have gained widespread acceptance, it has inherent disadvantages which limit the extent to which the quality of telephone service can be improved. It is inherent in the operation of the hybrid coil that one-half or 3 db of the signal voltage applied to any pair of terminals is lost in the hybrid coil. Dissipative losses in the transformer consume another one to four decibels of power, whereby the total loss in the hybrid coil is of the order of 4 to 7 db. A further shortcoming of present hybrids is that even when precision balance networks are used, the maximum isolation between the two ports coupled to the four-wire line is 18 to 23 db. To achieve this degree of isolation requires perfectly balanced transformer coils, difficult to achieve in practical transformers. The balance is affected by the inductive and capacitive reactance of the transformer, as well as the resistance drops in the transformer, with the consequence that the isolation between the four-wire ports is frequency sensitive. Finally, transformer hybrids are quite bulky and heavy and occupy a large volume, a significant disadvantage in large telephone exchanges. Resistance bridges have been used instead of transformers in an attempt to meet this shortcoming and to obtain better isolation characteristics, but this is at the expense of higher transmission losses—of the order of 16 db.

Another attempt to overcome the shortcomings of hybrid coils is exemplified by the electronic hybrid circuit disclosed in U.S. Pat. No. 2,511,948. The disclosed system, designed to couple a pair of two-wire transmission lines into a two wire two-way transmission line, consists of three amplifiers, one connected between the incoming transmission line and the common two-way line, a second connected between the common line and the outgoing two-wire line, and the third connected between the incoming line and the outgoing line. With this arrangement, signals in the incoming line are coupled to the input terminals of the first and third amplifiers where it is inverted in phase and applied to the common two-wire line and to the output terminals of the second-mentioned amplifier. The inverted signal at the output terminals of the first amplifier is also applied to the input of the second-mentioned amplifier where it is again inverted and added to the output of the third-mentioned amplifier. If the two signals appearing in the output transmission line are of equal magnitude and in phase opposition, they cancel each other and leave no resultant signal in the outgoing transmission line. This system does not have the objectionable high losses of a resistance bridge, because of the gain of the amplifiers, and the unidirectional nature of the amplifiers inherently afford isolation. With appropriate amplifier design, this circuit can be expected to show a 16 db gain in transmission over a resistance hybrid.

The just-described electronic hybrid has limited application, however, in spite of its improvement in some respects over the hybrid coil and resistance bridge, because it may be used only in systems where the impedance of the common two-wire line is purely resistive. If the load on the common two-wire line has a reactive component, which is usually the case in telephone systems, the phase difference between the input terminals of the aforementioned second and third amplifiers would be greater or less than 180° depending upon whether the reactance was inductive or capacitive. In either case, the balance of the circuit would be upset, there would not be total cancellation of the cross-channel signals, and consequently, the isolation between the incoming and outgoing two-wire channels would be degraded to a point where the system would be unsatisfactory.

With an appreciation of the foregoing limitations of prior art hybrid devices, applicants have as a primary object of this invention to improve the isolation between channels in a four-wire to two-wire coupling arrangement.

Another object of the invention is to provide an improved telephone hybrid coupling device for coupling from a four-wire system to a two wire system with minimum signal attenuation.

Another object of the present invention is to provide a telephone hybrid coupler affording inter-channel isolation which is relatively constant over a band of frequencies.

Another object of the invention is to provide an improved telephone hybrid coupler which is more compact and less expensive than prior art hybrid coil couplers.

The foregoing objects and others which will appear from the following detailed description are attained by an electronic bridge hybrid circuit including four amplifiers, a first being connected between the receiving circuit and the common phone line, the second being connected between the common line and the transmitting circuit, and the third and fourth being connected in series between the receiving and transmitting circuits. A phase-compensating network of the type currently used for balancing hybrid coils is connected in circuit between the third and fourth amplifiers for adjusting the phase of the signal cross-coupled from the input line to the output line. The provision of the balancing network in this bridge arrangement insures substantially complete cancellation of input signals coupled to the output line.

When the present circuit is used in systems where the impedance of the common phone line is purely resistive, isolation of the order of 70 db can easily be obtained. In the more usual application, where the common phone line has distributed reactive impedances, isolation is limited by the degree to which the phase-compensating network can match the reactive effects of the common line so as to produce a comparable phase shift. Employing available phase-compensating networks in the present hybrid bridge circuit, it has been found that 28 db of isolation between the input and the output signal channels can be obtained. This represents an improvement in isolation of 5 to 10 db over that afforded by the hybride coil and offers the further advantage of losslessness since active instead of passive devices are used. Linear amplifiers with high degenerative feedback are used in the bridge hybrid so as not to be sensitive to changes in frequency in the voice frequency band.

Other objects, features and advantages of the invention will be more apparent from the following detailed description taken in conjunction with the accmopanying drawings, in which.

Figure 1:
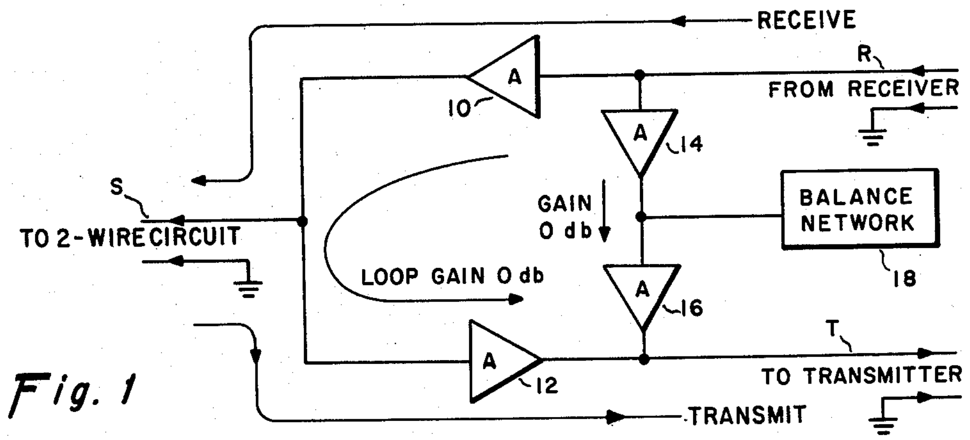
FIGURE 1 is a block diagram of the bridge hybrid circuit of the present invention.

Referring now to FIGURE 1, there is shown a two-wire transmission line S in which signals are transmitted in both directions, as is common in conventional telephone circuits. A two-wire transmission line R and a two-wire transmission line T are connected to a receiver and transmitter respectively. The function of the present circuit is to couple the two-wire unidirectional transmission lines R and T into the two-wire, two-way line S so that the received signal from receiving line R is transmitted only to the common line S. It is important that none of the received signals be coupled to the transmission line T, and likewise the transmitted signal going out along line T should not be coupled ot the receiving line R. This result is attained by connecting an amplifier 10 between the incoming transmission line R and the common two-way transmission line S. This amplifier, being a unidirectional device, amplifies only in the direction from line R to line S, and signals appearing at amplifier 10 from the common phone line S are not repeated to the receiving transmission line R. A second amplifier 12 is connected between the common line S and the transmitter line T and amplifier only in the direction from S to T.

The arrangement thus far described could repeat input signals appearing at the output terminals of amplifier 10 directly into the outgoing line T thus transmitting the received signal. This is overcome in the aforementioned Patent No. 2,511,948 by connecting a third amplifier between transmission lines R and T in such a manner that signals appearing at the input of this amplifier from transmission line R are amplified and introduced directly into the transmitting line T but of opposite phase to those appearing in line T from incoming line R through amplifiers 10 and 12. If these two signals appearing in transmission line R are of the same amplitude and in phase opposition, they would cancel each other and leave no resultant signal in the outgoing transmission line T. This complete cancellation is attainable, however, only in situations where the impedances of the line S is purely resistive. In practical telephone systems the two-wire line has distributed inductive and capacitive reactance, the magnitude of which is dependent on the length of the line and the load which terminates it. Thus, if the amplifier which is connected between lines R and T is adjusted to obtain cancellation for one length of line S at some center frequency, a change in the frequency, or in the length of the line, would change the phase characteristics of amplifiers 10 and 12 with the consequence that there would no longer be complete cancellation of these signals appearing in transmission line T.

This shortcoming is overcome by the present invention by connecting a pair of amplifiers 14 and 16 in series between transmission lines R and T, and connecting a phase-balance network 18 to the junction of these two amplifiers. Amplifier 14 is a non-inverting isolating amplifier for providing electrical isolation between the phase balance network 18 and transmission line R. The balance network 18 is of the type presently in widespread use to balance transformer hybrids to different line impedance situations. As is well known in the art, in systems using hybrid coils, a supply of balance networks of different impedance characteristics are provided and after the impedance of a two-wire line is determined by measurement, a network of the proper impedance to match the hybrid to that line is connected to the internal balance terminals of the hybrid transformer. Similarly, in the present system, balance network 18 is of the same form, and has impedance characteristics selected to match the impedance of the line S in which the hybrid bridge circuit is being installed.

Amplifiers 10 and 12 are designed to give a loop gain of zero db and each inverts the signal applied thereto, with the result that the signal applied to the input terminals of amplifier 10 from line R is in phase and of the same amplitude as the signal appearing at the output terminals of amplifier 12.

Signals appearing at the input of amplifier 10 from transmission line R are also introduced directly into the transmitting line T through amplifiers 14 and 16. Amplifier 14, as mentioned previously, is of a non-inverting type, and amplifier 16 is designed to invert the signal applied to its input terminals. Thus, since incoming signals on line R are twice inverted in the loop including amplifiers 10 and 12, the signal coupled through amplifiers 14 and 16 is of opposite phase to the loop signal. With amplifiers 14 and 16 designed to each afford zero db gain, these phase-opposed signals are also of equal amplitude, thereby canceling each other and leaving no resultant signal in the outgoing transmission line T. As in the circuit of the aforementioned patent, this is true if the load on line S is purely resistive. If the load is reactive, however, as is usually the case, the balance network 18 is provided to compensate for the somewhat greater or lesser than 360° phase shift in amplifiers 10 and 12 occasioned by the reactive impedance of line S. The balance network 18 is selected to have an impedance which is the image of the impedance of a particular line S so that the signal in the series path including amplifiers 14 and 16 is shifted the same amount as the signal flowing through amplifiers 10 and 12 thereby to achieve total cancellation.

The distributed reactive load introduced by the line S cannot always be accurately duplicated by precision balance networks composed of lumped parameter components, whereby the isolation obtainable with the present circuit also has inherent limitations. The best available precision balancing networks can accurately duplicate the reactive load of a two-wire line down to a signal level of approximately 28 db. This means that instruments sufficiently sensitive to detect the line voltage standing wave to a level 28 db below the input signal power level cannot distinguish between the minute standing wave introduced by a distributed reactance line and the standing wave introduced by a lumped parameter network. Below the level of approximately 28 db, currently available balance networks cannot exactly duplicate the standing wave condition and phase shift effect caused by distributed line reactances. Consequently, with presently available balance networks, the isolation between lines T and R is limited to approximately 28 db, not by the hybrid bridge arrangement itself, but by inherent limitations of the balance network. With improved networks, capable of duplicating the distributed reactance of the two-wire line, greater isolation is theoretically possible.

Figure 2:
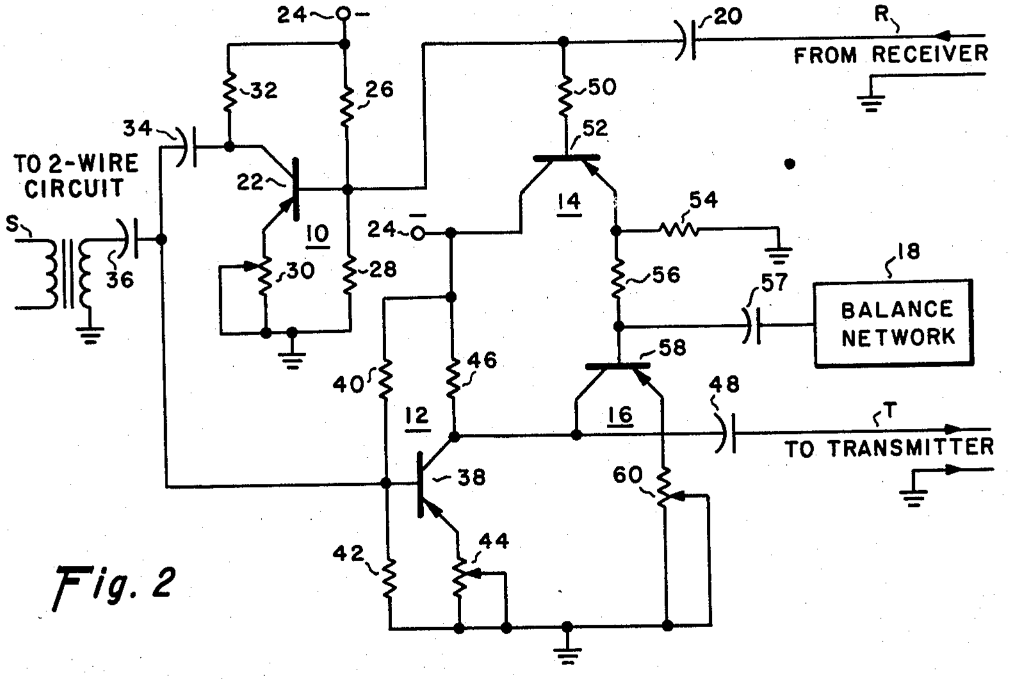
FIGURE 2 is a schematic circuit diagram of the bridge hybrid circuit of FIGURE 1.

The hybrid bridge circuit of FIGURE 1 may be readily implemented with transistorized circuits, as shown in FIGURE 2, to permit its being assembled in a package very small compared to the volume of coil hybrids. The four transistors and associated components necessary for the four amplifiers can be assembled on a single printed circuit card, permitting several hybrid circuits to be assembled in the volume needed for a single hybrid transformer. Referring to FIGURE 2, the signal from the receiver line R is coupled through capacitor 20 to the base electrode of transistor 22 which is connected as a grounded emitter amplifier 10. The transistor is energized from a source of negative potential, represented by terminal 24, and for this reason transistor 22 and the other three transistors are of the PNP type. Should it be preferred to use a direct current power supply of positive polarity, NPN transistors could be used with equal effectiveness. The base of the transistor is biased by the voltage divider consisting of series resistors 26 and 28 connected between terminal 24 and ground, and the emitter electrode is connected through potentiometer 30 to ground, the potentiometer being provided to adjust the gain of the amplifier stage. The signal developed across the collector load resistor 32 is coupled through capacitor 34 and capacitor 36 to the line S, and to the base electrode of transistor 38 in amplifier 12. This transistor is biased by the voltage divider consisting of series resistors 40 and 42 connected between the source of negative potential and ground, and the emitter electrode is connected to ground through potentiometer 44. The signal developed across collector load resistor 46 is coupled through capacitor 48 to the outgoing transmission line T. Both of amplifiers 10 and 12 invert the signal applied to its base electrode whereby the signal appearing on line T is shifted 360° (disregarding the reactive loading of the two-wire line) relative to the incoming signal on line R. The potentiometer in the emitter circuit of transistors 22 and 38 provide degenerative feedback in their respective amplifiers to insure linear operation.

The incoming signal on line R is also applied through a resistor 50 to the base electrode of transistor 52, the emitter of which is connected to ground through a load resistor 54. The collector of transistor 51 is connected to the source of negative potential 24 with the result that the signal developed across emitter load resistor 54 is in phase with the signal applied to the base electrode.

The output signal from amplifier 14 is applied via an impedance matching resistor 56 to the base electrode of transistor 58, the collector of which is connected to outgoing transmission line T and the emitter of which is connected through a gain-adjusting potentiometer 60 to ground. Amplifier 16 inverts the signal applied to the base of transistor 58 with the result that the signal appearing at the collector of transistor 58 is in phase opposition to the signal applied to the base electrode of transistor 52. Recalling that the signal at the collector of transistor 38 is shifted 360° with respect to the incoming signal, the signal at the collector of transistor 58 is in phase opposition therewith whereby the two signals cancel to prevent repeating the incoming signal in the outgoing transmission line T. It will be apparent that for complete cancellation to occur, the gain of the loop including amplifiers 10 and 12 must be equal to the gain of series-connected amplifiers 14 and 16. By way of example, amplifiers 10 and 12 may be respectively adjusted by potentiometers 30 and 44 to give a total loop gain of zero db, and the gain of amplifier 16 adjusted by potentiometer 60 to give a gain of zero db for the series-connected amplifiers 14 and 16. It will be appreciated that the use of linear amplifiers, together with RC coupling provides a broadband hybrid circuit, which is capable of operation at carrier frequencies, as well as at audio frequencies.

As was mentioned earlier, complete cancellation is also conditioned on the loop and cross-coupled signals being 180° out of phase, a condition which will be upset by the reactive impedances of line S being reflected in amplifiers 10 and 12 unless the cross-coupling amplifiers are subjected to like-compensating reactive impedances. To this end, balance network 18 is connected via capacitor 57 to the base electrode of transistor 58 to cause amplifier 16 to introduce a phase shift of more or less than 180° depending on the characteristics of the network. For example, should the reactance of subscriber line S cause amplifiers 10 and 12 to exhibit a total phase shift of 358°, a balance network having reactance characteristics to cause amplifier 16 to exhibit a phase shift 178° would be selected. Capacitor 57 is of a value to match the phase shift caused by capacitor 36 in the two-wire line. It is emphasized that balance network 18 is of a type well known to the telephone art and is selected according to the previously measured impedance of the two-wire line to which a particular hybrid circuit is to be connected. The employment of degenerative feedback in the amplifier stages insures linear operation over the range of frequencies encountered in telephone service whereby the degree of interchannel operation is independent of frequency within the limits of the ability of balance network 18 to duplicate the reactive impedance of line S. As was mentioned earlier, with available balance networks, isolation of the order of 28 db can be achieved, and it is important to note that this is not at the expense of increased transmission losses; rather, the transmission losses in the hybrid of the present invention are substantially eliminated because of the gain of the amplifiers.

Figure 3:
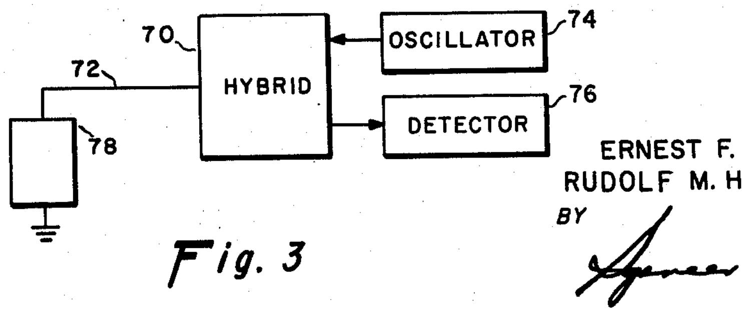
FIGURE 3 illustrates in block diagram form the application of the principles of the invention as an impedance bridge for measuring line return loss in telpehone systems.

Because the present circuit is a lossless windband device, it may also be employed in a variety of test instruments such as for measuring the impedance of long distance telephone lines, a necessary preliminary to the selection of terminal equipment. An instrument currently in use for the latter purpose is schematically illustrated in FIGURE 3 consisting of a three-terminal hybrid 70 one terminal of which is connected to the two-wire line 72 whose impedance it is desired to measure and the other terminals connected to an oscillator 74 and to a detector 76, respectively. Because the impedance of the line 72 can be expected to vary with frequency, measurements are made over the band of interest by adjusting the frequency of oscillator 74. Further, it is essential to accurate measurement of line loss, that signals transmitted down the line be of fixed amplitude at all frequencies. Because the transfer characteristics of transformer hybrids are frequency sensitive, it is necessary to use a resistive hybrid in this test instrument. Resistive hybrids have the disadvantage, however, of being very lossy, conventional resistive hybrids having approximately 16 db insertion loss for signals traveling in each direction. How this high loss limits the sensitivity of measurement will be seen from the following description of operation of the instrument.

During tests, the line 72 whose line losses are to be determined is terminated in an impedance 78. Signals from oscillator 74 are coupled to line 72 through hybrid 70 and transmitted down the line. Because of the distributed reactance of the line, low level signal reflections occur which are transmitted back to the hybrid where they are coupled to detector 76. The detector is designed to respond to the reflected signals to give a visual indication to an operator of ohmic peaks and valleys as function of frequency. The effectiveness of currently available instruments is limited because the hybrid 70 attenuates a signal by 16 db each time it passes through it. That is, the signal from oscillator 74 is attenuated by 16 db before it is applied to line 72, and likewise, the reflected signals are attenuated by 16 db before application to the detector. By way of example, if the line loss of line 72 is assumed to be —28 db, the signal from oscillator 74 will suffer a loss of 28 db in the line and a total of 32 db in the hybrid before reaching the detector, a total of 60 db. Thus, the detector must have a sensitivity to enable it to detect signals of the order of —60 db below the output of the oscillator to give an effective measurement. With available instruments, the peaks and valleys indicated by the detector are very shallow at signal levels approximating —60 db, frequently resulting in false balances.

The hybrid circuit of the present invention being lossless, as well as insensitive to frequency, its incorporation in the test setup of FIGURE 3 would return signals to the detector reduced only by the return loss of the line, 72, or approximately 28 db below level of the signal delivered by oscillator 74. Thus, the accuracy of return loss measuring instruments may be vastly improved since with a comparable detector sensitivity the peaks and valleys of the returned signal with changes in frequency are much sharper and more easily detected.

It will be apparent from the foregoing that applicants have provided an electronic hybrid bridge circuit which is essentially lossless and frequency insensitive and useful with purely resistive loads as well as with loads having reactive impedance. For the latter condition, a balance network having an impedance which is the image of the load is connected in the bridge circuit, but for resistive loads greatly improved isolation is achieved without the balance network. For resistive loads, the four-amplifier bridge is capable of giving isolations of the order of 70 db, and for reactive loads, using currently available balance networks, it is possible to achieve isolations of the order of 28 db over the range of frequencies encountered in telephone service.

Various modifications will now be apparent to one skilled in the art without departing from the true spirit thereof. For example, vacuum tubes may be used instead of transistors (at the expense of larger volume and power consumption) and transistorized amplifiers of different forms may be used. It is the intention, therefore, that the invention not be limited to what has been shown and described except as such limitations appear in the appended claims.

What is claimed is:

1. A hybrid circuit for coupling an incoming line and an outgoing line to a two-way line comprising, a first signal-inverting amplifier connected in said incoming line and arranged to conduct signals only in the direction toward said two-way line, a second signal-inverting amplifier connected in said outgoing line arranged to conduct signals only in the direction away from said two-way line to said outgoing line, third and fourth amplifiers series-connected in that order between said incoming line and said outgoing line and arranged to conduct signals only in the direction from said incoming to said outgoing line, only one of said third and fourth amplifiers being arranged to invert the signals applied thereto whereby a signal on said incoming line coupled to said outgoing line through said third and fourth amplifiers is substantially in phase opposition with the output signal from said second amplifier, and a phase compensating network having an impedance substantially equal to the image of the impedance of said two-way line connected to the junction of said third and fourth amplifiers.

2. An electronic bridge hybrid circuit for coupling an incoming line and an outgoing line to a two-way line comprising, a first signal-inverting amplifier connected in said incoming line and arranged to conduct signals only to said two-way line, a second signal-inverting amplifier connected in said outgoing line and arranged to conduct signals only from said two-way line to said outgoing line, third and fourth amplifiers series-connected in that order between said incoming line and said outgoing line and arranged to conduct signals in one direction only from said incoming to said outgoing line, said third and fourth amplifiers having a combined gain equal to the combined gain of said first and second amplifiers, only one of said third and fourth amplifiers being arranged to invert the signal applied thereto whereby a signal on said incoming line coupled to said outgoing line through said third and fourth amplifiers is substantially in phase opposition with the output signal from said second amplifier, and a phase-compensating network having an impedance substantially equal to the image of the impedance of said two-way line connected to the junction of said third and fourth amplifiers.

3. An electronic bridge hybrid circuit for coupling an incoming line and an outgoing line to a common two-way line comprising, a first signal-inverting amplifier connected in said incoming line arranged to conduct signals only to said two-way line, a second signal-inverting amplifier connected in said outgoing line arranged to conduct signals only from said two-way line to said outgoing line, third and fourth amplifiers series-connected in that order between said incoming line and said outgoing line arranged to conduct signals only in the direction from said incoming to said outgoing line, said third and fourth amplifiers having a combined gain equal to the combined gain of said first and second amplifiers, said fourth amplifier only being arranged to invert the signal applied thereto whereby a signal on said incoming line coupled to said outgoing line through said third and fourth amplifiers is substantially in phase opposition with the output signal from said second amplifier, and a phase-compensating network connected to the junction of said third and fourth amplifiers, said network having an impedance substantially equal to the image of the impedance of said two-way line at the frequency of operation.

4. An electronic bridge hybrid circuit for coupling an incoming line and an outgoing line to a two-way line comprising, a first signal-inverting adjustable-gain amplifier connected in said incoming line and arranged to conduct an incoming signal only to said two-way line, a second signal-inverting adjustable gain amplifier connected between said two-way line and said outgoing line and arranged to conduct signals from said two-way line or from said first amplifier only to said outgoing line, a non-inverting third amplifier and an adjustable-gain signal-inverting fourth amplifier series connected in that order between said incoming line and said outgoing line and arranged to conduct signals only in the direction from said incoming line to said outgoing line, and a phase-compensating network connected to the junction of said third and fourth amplifiers, said network having impedance characteristics which causes a shift in phase of an incoming signal conducted from said incoming line to said outgoing line through said third and fourth amplifiers equal to the shift in phase of an incoming signal conducted through said first and second amplifiers caused by the impedance characteristic of said two-wire line, the combined gain of said first and second amplifiers being substantially equal to the combined gain of said third and fourth amplifiers whereby incoming signals coupled to said output line through said third and fourth amplifiers are of equal amplitude and in phase-opposition to incoming signals coupled to said outgoing line through said first and second amplifiers.

5. The circuit of claim 4 wherein the combined gain of said first and second amplifiers is substantially zero db.

6. A hybrid circuit for coupling an incoming line and an outgoing line to a two-way line comprising, a first signal-inverting linear amplifier connected in said incoming line and arranged to conduct signals only in the direction toward said two-way line, a second signal-inverting linear amplifier connected in said outgoing line arranged to conduct signals only in the direction away from said two-way line to said outgoing line, third and fourth linear amplifiers series-connected in that order between said incoming line and said outgoing line and arranged to conduct signals only in the direction from said incoming to said outgoing line, only one of said third and fourth amplifiers being arranged to invert the signals applied thereto whereby a signal on said incoming line coupled to said outgoing line through said third and fourth amplifiers is substantially in phase opposition with the output signal from said second amplifier, and a phase compensating network having an impedance substantially equal to the image of the impedance of said two-way line connected to the junction of said third and fourth amplifiers.

References Cited by the Examiner

UNITED STATES PATENTS

| | | | |
|---|---|---|---|
| 2,579,571 | 12/51 | Heck | 179—170 |
| 2,590,104 | 3/52 | King | 330—123 |

ROBERT H. ROSE, *Primary Examiner.*

WILLIAM L. LYNDE, *Examiner.*